United States Patent [19]

Cahill

[11] 4,439,789

[45] Mar. 27, 1984

[54] BINARY SCAN SYSTEM

[75] Inventor: Lysle D. Cahill, Dayton, Ohio

[73] Assignee: Coulter Systems Corporation, Bedford, Mass.

[21] Appl. No.: 139,464

[22] Filed: Apr. 11, 1980

[51] Int. Cl.³ .................. H04N 1/00; H04N 1/028; H04N 1/40

[52] U.S. Cl. .................. 358/256; 358/263; 358/282; 358/285; 358/294

[58] Field of Search .............. 358/263, 280, 282, 283, 358/285, 293, 294, 228, 231, 233, 61, 256; 350/356

[56] References Cited

U.S. PATENT DOCUMENTS

| | | | |
|---|---|---|---|
| 2,730,567 | 1/1956 | McConnell | 358/294 |
| 3,159,815 | 12/1964 | Groce | 358/282 |
| 3,367,733 | 2/1968 | Grau | 350/356 |
| 3,604,846 | 9/1971 | Behane | 358/263 |
| 3,930,119 | 12/1975 | Schmidt et al. | 358/285 |
| 4,025,339 | 5/1977 | Kuehnle | 430/63 |
| 4,046,471 | 9/1977 | Branham et al. | 358/300 |
| 4,174,526 | 11/1979 | Geurts | 358/228 |
| 4,196,452 | 4/1980 | Warren | 358/293 |
| 4,272,789 | 6/1981 | Biron | 358/282 |

OTHER PUBLICATIONS

Thorpe–Optical Scanner–IBM Tech. Discl. Bull. vol. 4, #7, Dec. 1961, p. 20.

Primary Examiner—Joseph A. Orsino, Jr.

Attorney, Agent, or Firm—Silverman, Cass & Singer Ltd.

[57] ABSTRACT

An original image is reproduced on an electrophotographic member with a series of binary data bits having a statistically valid count corresponding to the relative density of the original image.

A sensor senses the density value of individual information forming structure or structures in incremental areas of the original image and converts the density values into a series of binary data bits, one bit per incremental area. An imager receives the binary data bits and forms one binary element on the charged electrophotographic member surface in response to each bit. The elements formed on the member surface correspond in sense to the binary data bits from the sensor and the elements are formed in incremental areas of the member corresponding to the incremental areas of the original image from which their respective binary data bits were produced.

An aperture of the sensor which determines the size and configuration of the incremental area scanned is adjustable to aproximately the size and configuration of the information structure and a threshold level value of the sensed density values is adjustable to the mean of the sensed densities of the original image so that a sensed density value above the threshold value produces a binary bit of one sense and a sensed density value below the threshold value produces a binary bit of the other sense to produce the statistically valid count of the series of binary data bits.

52 Claims, 7 Drawing Figures

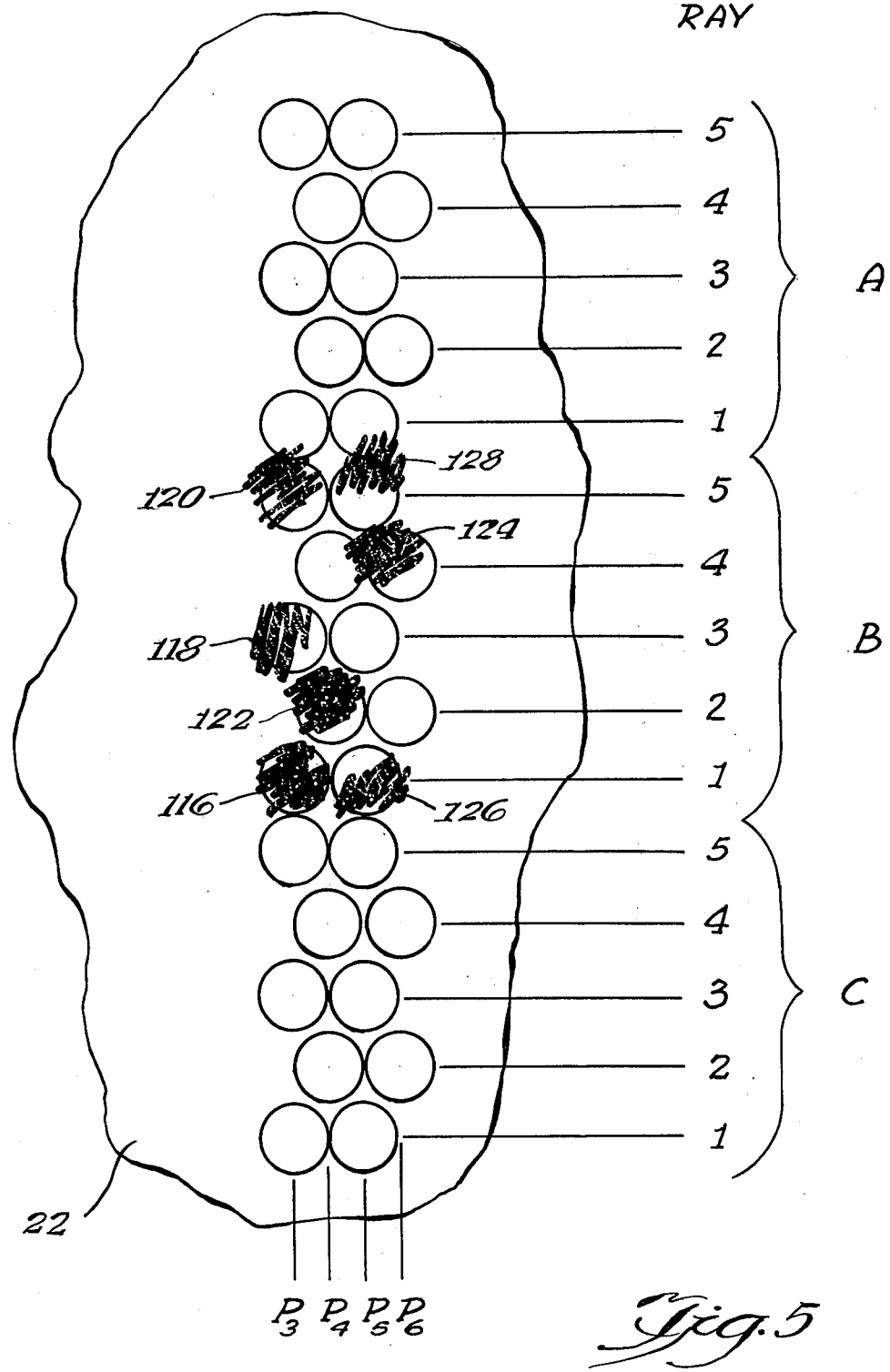

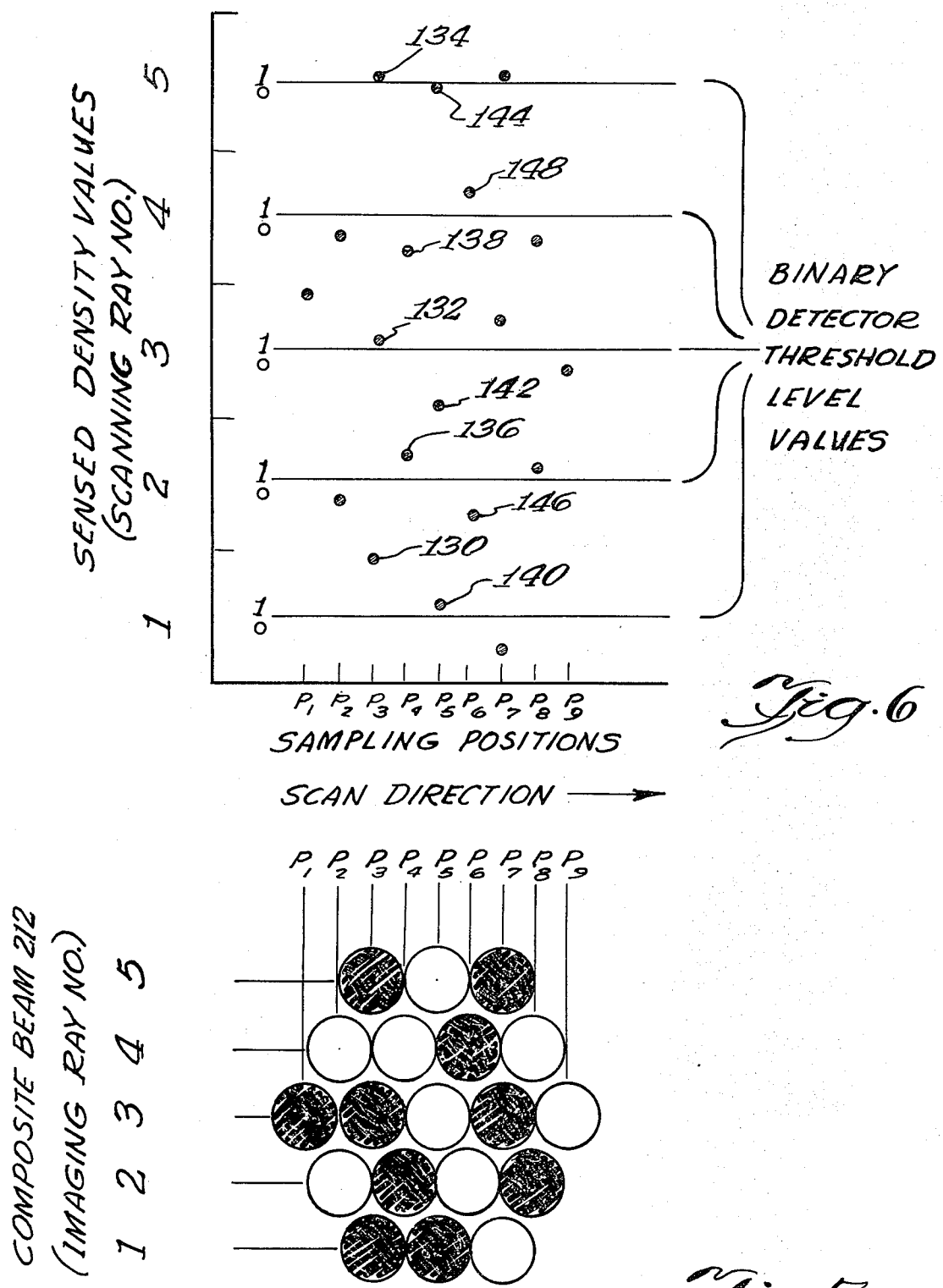

BINARY SCAN SYSTEM

CROSS REFERENCE TO RELATED APPLICATIONS AND PATENT

Reference is made hereinafter to copending application Ser. No. 11,320 filed Feb. 13, 1979 and entitled DIGITAL LASER PLATE MAKER AND METHOD, the applicant being Lysle D. Cahill.

Reference is also made herein to U.S. Pat. No. 4,025,339 issued on May 24, 1977 to Manfred R. Kuehnle.

The application and patent above identified are owned by the assignee of the application herein.

FIELD AND BACKGROUND OF THE INVENTION

The field of the invention comprises apparatus and a method for reproducing an original image on an electrophotographic member by scanning the elements or information forming structure of the original image and imaging the electrophotographic member with a radiant energy source such as a laser, the imaged electrophotographic member carrying the reproduced original image being thereafter used primarily for printing.

In the case of lithographic offset printing the imaged member is treated to render toned and untoned parts hydrophobic and hydrophilic, respectively and the member comprises the printing plate without further processing. In other cases the toned electrophotographic member may be used as an information source by reading the images or projecting them if transparent or photographically reproducing them if desired. The preferred use of the invention is to make printing plates either on transparent synthetic resin sheeting such as polyester or upon metal such as stainless steel. Each of these substrates is coated with a type of photoconductive coating which will be described hereinafter.

In photography the film exposed to light carries silver salts, which are light sensitive, in a suitable emulsion. Exposure of the film to a scene changes the chemical composition of the salts, there being a precipitation of silver grains as a result of the exposure and the amount of silver precipitated being proportional to the degree of exposure. The film is then developed to render the precipitated silver grains visible. Since the grains are very small, the scene of varying light or continuous tones appears to be reproduced on the film although in fact it is made up of these tiny grains of different size irregularly spaced apart and distributed in accordance with the light distribution of the scene.

In relation to the invention herein, the individual silver grains may be considered as individual information forming structures whose size and distribution determine the overall result being achieved.

In order to print photographs having continuous tones, the so-called halftone process was developed many years ago, which creates an optical illusion in which the tones are represented by patterns of small dots of different sizes printed with ink uniformly applied. Areas to be printed in a dark tone may have large dots closely spaced and possibly overlapping while areas to be printed in a light tone may have small dots widely spaced. As in photography, the eye integrates the patterns of dots together to achieve a reproduction of the represented tones.

Halftone processing forms the dots by photographing the original image through a screen of parallel and perpendicular lines, the resulting photograph having large dots corresponding to the dark areas of the original image and small dots corresponding to the light areas of the original image. Black and white graphics are photographed through the screen once while color graphics are photographed through the screen once for each color to be printed with the screen being rotated to a different angle for each color photograph taken to avoid moire patterning and a different color filter being used to separate the original image into its primary colors for printing.

It should be noted that the dots formed in the halftone process in many cases can be seen with the naked eye, their size generally being much greater than the size of the precipitated silver crystals in an exposed photographic film.

Using other photographic processes, these arrays of spaced dots are then transferred to metal surfaces to form the printing plates which will be installed in the printing press which is to reproduce the original image. For color the printing plates are required to print the respective colored images in precise registration on the receptor which is normally a web of paper and hence there will be as many impressions on a given area of the paper as there are color plates. The composite of these arrays of dots will produce a resultant array of dots many of which will overlie one another to give a color mixture attempting to reproduce the color of the originally photographed image as closely as possible.

In the case of black and white printing the use of the halftone process provides arrays of dots on a receptor or paper which give varying shades of gray between white where there are no dots and black where the dots are so close together and so large that they carry heavy coatings of ink in the press. In the case of color printing, multiple impressions on a receptor are required not only to provide the different shades of light and dark for information content but also to provide the multiple hues of color that are needed to attempt to reproduce the original continuous tone image.

The process of making plates using the same techniques as have conventionally been used, that is making the color separations and deriving the metal plates therefrom has in recent times been effectuated electronically. Photosensors are used to sense the intensity or density of incremental areas of continuous tone original images through colored filters. The sensed densities are converted into digital data which are intended to represent the various densities of the incremental areas of the original image. This digital data is then used to reproduce the original image as an array of dots of uniform area on a heat or light sensitive member from which the printing plate is made.

The sensed densities of the incremental areas of the original image in each color separation are usually treated as steps of a gray scale, the scale extending from the least dense or white to the most dense or black. When the sensed densities are converted to digital data, the sensed densities are converted to digital numbers corresponding to the sensed step of the gray scale. The digital numbers then are used to form a particular pattern of halftone dots on the member from which the plate is made. Each pattern of dots is equivalent in area density to the sensed density of a corresponding incremental area of the original image. When the pattern is printed, theoretically an equivalent area density of ink of each color is transferred to the receptor or paper stock.

It should be noted that the dots formed in making the manual and electronic halftone color separations are different. The dots formed in the manual process vary in surface area and spacing from the surrounding dots to produce the varying densities or shades of gray. Thus as has been explained earlier, a light gray or weak density image is represented by small dots spaced a great distance from the surrounding dots. A dark gray or strong intensity image is represented by large dots almost or actually touching each other. The dots formed electronically are generally fixed in size and spacing. Their size is usually determined by the material used and may be equal in size to the smallest dot formed in the manual process. The varying intensities are formed or represented by the number of dots in a matrix of unit area. Thus a light gray image is represented by a small number of dots in each matrix or in one of several matrices. A dark gray image is represented by a large number of dots in a single matrix.

The speed at which such electronic systems may sense the original image and form or image the halftone array of dots is limited, in part, by the computation times required at both the sensor and imager in converting to and from the digital data. At the sensor some type of conversion must be made from the analog density sensed in the original image to the digital numbers representing the steps of the gray scale. At the imager a conversion must be made from the digital data to the number of dots which are in a matrix or an incremental area of the member from which the printing plate is to be formed. If processing of the data before imaging is to occur to perform tasks such as line or edge enhancement, further time is required and the reproduction process is slowed further.

Another part of such electronic reproduction systems which limits the system speed is the imaged member from which the plate is made. These members generally have been heat or light sensitive members which are imaged with a source of radiant energy such as a laser. The materials from which these members have been made must be exposed or activated with a discrete amount of radiant energy on an elemental area over a certain period of time so as to form the image but not to burn through the material. This poses problems in performing the imaging and increasing the system speed. Imaging in this way may not be as time or labor consuming as manual production of plates but is not rapid enough to perform high speed or on-line imaging. Accordingly it is not utilized to any great extent for the manufacture of printing plates.

The present invention eliminates these speed problems by binarily reproducing the original image which may have continuous tones therein. An incremental area of the original image is sensed to statistically determine whether an information structure is present therein. A binary bit is produced which carries the result of the determination to an imaging apparatus. In the imager a binary element is formed on an electrophotographic member in a sense corresponding to the binary data bit and in a position corresponding to the sensed incremental area. Generally speaking, individual ones of the information structures of the original image are reproduced on the electrophotographic member.

The size and placement of the elements so formed on the electrophotographic member is finer and the speed at which imaging occurs is faster than anything utilizing dots in the prior art. This is feasible because primarily there is a photoconductive coating described and claimed in U.S. Pat. No. 4,025,339 for which the invention is especially advantageous which has a resolution greater than other photoconductive coatings thereby enabling very small undischarged areas on its surface to be toned. These will form the printing elements or formations of the printing plate carrying ink to the receptor. This enables the use of a large number of elements with which to reproduce the original image without any detectable degradation of the resolution of the reproduced image. This particular photoconductive coating also has a discharge rate greater than other photoconductive coatings, enabling a very fast formation of elements on its surface such as by discharging incremental areas of the charged member which allows on-line, high speed reproduction of the original image on the imaged member by discharging incremental areas of the member as fast as the original image can be sensed.

U.S. Pat. No. 3,604,846 discloses a method of sensing an original image and reproducing it on a receptor by means of marking dots. Incremental areas of the original image are sensed by passing a beam of light through the transparent original image and converting the modulated light into electrical signals in a photomultiplier tube. These electrical signals are recorded on a magnetic tape and fed into an electronic computer where they are manipulated into digital data representing the steps of a 10 step gray scale. Each item of data is arranged to represent an incremental area of the original image in a $3 \times 3$ format, providing 10 density values corresponding to the number of the 9 possible points in the $3 \times 3$ grid which are blackened by the marking dots formed on the receptor. From the data produced by the computer, a marking device such as an ink jet printer forms the marking dots on the receptor. This patent is an example of a reproduction system utilizing dots formed in a matrix which uses the steps of a gray scale to represent the variations in tone of the original image. This system is not as fast as that enabled by the present invention because of the required computation time between sensing the imaging and does not provide the resolution of the reproduced image as does the present invention.

SUMMARY OF THE INVENTION

In accordance with the invention an original image is reproduced on a electrophotographic member by reproducing the information forming structure of the original image on the member with a statistically valid count of binary data bits. The member then may be used as a printing plate of an offset lithographic printing press or as desired.

The original image and a sensor are moved relative to each other in a predetermined pattern with the sensor sensing the density of the individual information forming structures in incremental areas of the original image and producing a series of binary data bits representative of the original image, each bit corresponding to the sensed density value in one incremental area. The sensor is adjustable to produce a statistically valid count of the binary data bits corresponding to the relative density of the entire original image.

The electrophotographic member is imaged in response to the series of binary data bits to form the original image thereon by forming one binary element on the surface of the member for each binary data bit in an area corresponding to the sensed area of the original image and in a sense corresponding to the sense of the binary data bit. Binary elements are formed on the charged member by leaving charged areas and by discharging areas of the member. The latent image on the charged member surface formed by the charged areas may be toned and fused to form solid printing formations on the member. The solid printing formations may subsequently be processed to render them hydrophobic and the remaining areas hydrophilic so that the resulting article may be used as an offset lithographic printing plate without further processing.

BRIEF DESCRIPTION OF THE DRAWINGS

FIG. 5 is a chart of a field of information forming structures in incremental areas of an original image illustrating the horizontal scan lines and vertical sensing positions;

FIG. 6 is a graph of sensed density values for the individual information forming structures in scan line B, positions P3-P6 of FIG. 5 for each of scanning rays R1-R5 and showing additional sensed density values and a threshold level value for each ray; and FIG. 7 is a chart of binary elements formed on the electrophotographic member in response to the sensed values illustrated in FIG. 6.

DESCRIPTION OF THE PREFERRED EMBODIMENT

Figure 1:
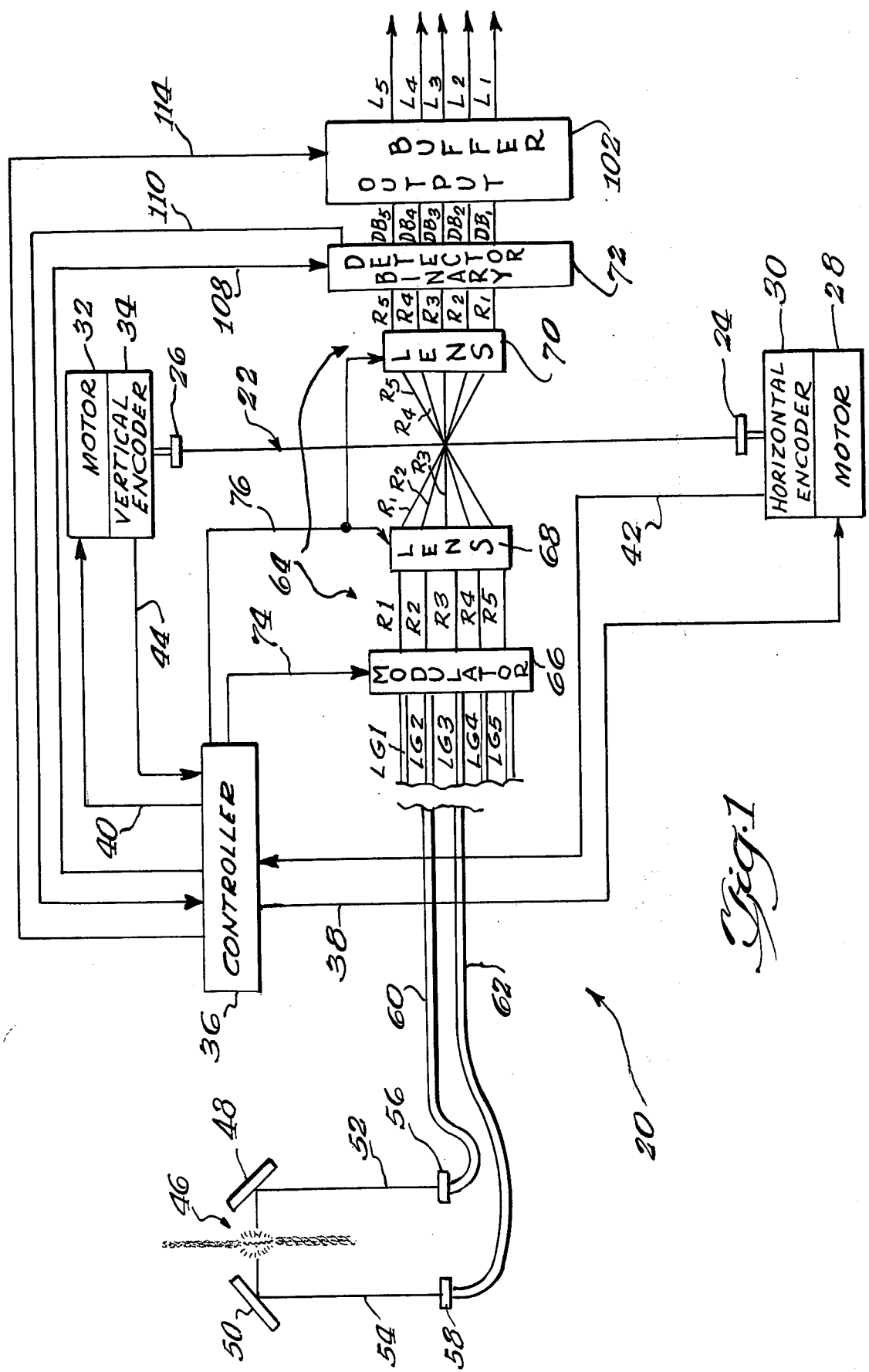
FIG. 1 is a block diagram of an apparatus for scanning an original image that is constructed in accordance with the invention and uses the method of the invention.

As an overview of the preferred embodiment of the invention, an original image which is comprised of a plurality of individual information forming structures is mounted in a scanning apparatus such as a flatbed scanner which holds the original image in a plane adjacent a sensor. The original image is transparent and the sensor operates by passing a beam of radiant energy such as light through the original image. The sensor and the original image are moved relative to one another in a defined and predetermined pattern with the sensor sensing the density values of the individual information structures in incremental areas of the original image.

The incremental areas of the original image are indexed by encoders fixed to drive mechanisms moving the sensor and image relative to each other so that the sensed density values of the original image may be correlated to their respective incremental areas.

The sensor may be comprised of one or more sensing elements, each of which senses the analog density value of one incremental area of the original image and produces a binary data bit therefrom. Each sensing element is comprised of an aperture through which the incremental areas of the original image are sensed and which determines the size and configuration of the sensed incremental areas. Each aperture is adjustable so that its resolution may be set to correspond to the size and shape of the information structures of the original image. Adjustment of the aperture resolution may occur before or during a scan of an original image and may occur manually or automatically and in response to the sensed densities of the original image.

Each sensing element further includes an analog to digital converter which converts an analog signal representing a sensed density value of an incremental area of the original image into a binary data bit. A sensed density value above an adjustable threshold level value is converted into a data bit of one sense, while a sensed density value below the threshold value is converted to a binary data bit of the other sense.

A statistically valid count of the binary data bits to represent properly the original image in the reproduced image is obtained by adjusting the aperture of the sensor relative to the size and configuration of the information structure of the original image and by adjusting the threshold level value of the sensor relative to the mean of the densities of the original image. A count of the binary data bits refers to the number of data bits of the one sense and the number of data bits of the other sense.

The binary information from the sensor elements then is distributed to an imager or imaging device where binary elements are formed in imaged incremental areas of an electrophotographic member. One imaged element is formed in response to and in the same binary sense as each binary data bit and each imaged element is formed in a location corresponding to the location of the sensed incremental area from which the binary data bit was produced.

In the preferred embodiment the imager is essentially the apparatus described in copending U.S. application Ser. No. 11,320 filed Feb. 13, 1979, previously referred to herein, and the disclosure of the imaging device of which is incorporated herein by reference. In the imaging device of the copending application, a laser beam modulated by binary data is utilized to image an electrophotographic member that includes a photoconductive coating that has been previously charged. The member is carried on a rotary drum, is toned on the drum and thereafter may be used to transfer the toned image or to serve as a medium for projection or printing of the image. In the case of printing, the toned image is used to carry ink in a printing press, the member being treated to achieve hydrophilic and hydrophobic areas to enable offset lithographic use of the member as a printing plate.

The preferred use of the imaged member herein is as a printing plate and hence the same type of photoconductive, imagable coating is preferably the receptor of the laser beams in the imager apparatus of the invention. Such coating is the coating which is described and claimed in U.S. Pat. No. 4,025,339 the disclosure of which is incorporated herein by reference.

It is also pointed out that while the preferred purpose of the invention is to make offset lithographic plates by electrostatic techniques, any use of an electrophotographic member will find advantages where the member has been imaged according to the invention.

Referring now to FIG. 1 of the drawings, there is illustrated a scanning apparatus indicated generally by the reference character 20. One may visualize the scanning apparatus best by considering that its purpose is to produce one binary digital data bit from each sensed incremental area of an original image which is to be reproduced. The original image is scanned with radiant energy in incremental areas thereof to determine the relative density of the individual information structure therein and a binary decision is made as to whether the binary data output representing the density value of that incremental area is a logical 1 or 0.

An original image 22 is mounted in the scanning apparatus 20 in a flatbed configuration, so that the image may be moved horizontally and vertically relative to the scanning apparatus. The image 22 is engaged on a horizontal drive shaft 24 and a vertical drive shaft 26, both of which are diagrammatically represented in the drawing. Horizontal drive shaft 24 is driven by motor 28 and the relative movement of shaft 24 is sensed by horizontal encoder 30. Drive shaft 26 in a like manner is driven by a motor 32 and its relative movement is sensed by vertical encoder 34. Motors 28 and 32 are controlled in their drive movements by a controller 36 to which they are respectively connected by leads 38 and 40. The relative movements of the drive shafts 24 and 26 are fed to the controller by the encoders 30 and 34 through leads 42 and 44 respectively. Thus the controller 36, the motors 28 and 32 and the encoders 30 and 34 form a feedback loop by which the movements of the image 22 may be precisely controlled to effect a predetermined and accurately defined scanning pattern thereon, the predetermined scanning pattern being contained in controller 36. The scanning pattern may be any pattern desired, and in the preferred embodiment, the pattern is from left to right in successive horizontal lines.

Scanning occurs by passing several beams or rays of radiant energy through transparent original image 22, one beam for each incremental area to be sensed, and measuring the modulation of the beams caused by the individual information structure or structures in each incremental area to determine the relative density value of the information structures thereof. The cross section of each beam thus determines the area of the incremental area sensed.

It should be noted that in the preferred embodiment the image 22 is such as a photographic transparency which is formed of a multitude of silver salt crystals some of which have been exposed to light and developed to render them as opaque grains and some of which have not been so exposed to light and remain transparent, the whole of the opaque grains combining to form the information of the image 22. The scanning performed by the apparatus 20 senses the density values of these individual information forming structures in incremental areas closely approximating the size of the individual forming structures. While the preferred embodiment is explained in connection with an image 22 which is a photographic transparency, other transparencies may be used in a like manner as may other images which are opaque, but in which case the beams of light are reflected from the image 22.

A point source of radiant energy such as an electric arc lamp 46 is used to produce a white light. Mirrors 48 and 50 are arranged radially around the circumference of lamp 46 and respectively direct rays of light 52 and 54 to receiving ends 56 and 58 of optical fibers 60 and 62. Thus radiant energy in the form of white light having a relatively well defined path is obtained with which the scanning may be performed. Other ways of obtaining radiant energy are known with the description of this means in connection with the preferred embodiment serving only as an example. Only two optical fibers 60 and 62 are shown for clarity of the drawing figure, there being as many such fibers and mirrors as there are sensor elements.

Sensor 64 comprises a modulator 66, lenses 68 and 70 and binary detector 72 which form five parallel sensing elements for simultaneously sensing the density of five adjoining incremental areas of the original image. Radiant energy is supplied to the modulator 66 through light guides LG1 through LG5. Light guides LG1 through LG5 correspond to the ends of optical fibers 60 and 62 opposite receiving ends 56 and 58, there being as many light guides as desired as explained above.

Radiant energy in the form of light in light guides LG1 through LG5 enters the modulator 66 which acts as a gate or switch of the light. Modulator 66 receives signals from the controller 36 through lead 74 and in response to those signals selectively allows the light from light guides LG1 through LG5 to pass therethrough and form rays R1 through R5. The signals from the controller 36 are such that rays R1 through R5 are allowed to be formed only when incremental areas of the image 22 are properly positioned relative to the sensor 64 or are in registration therewith. It will be remembered that the controller 36 contains the predetermined scanning pattern of the image 22 and thus not only controls the movement of image 22 but also the application of radiant energy thereto to perform the sensing of the density of the information forming structure of the image 22.

Rays R1 through R5 from the modulator 66 are directed to and pass through lens 68 of lens system 68 and 70 which scales and directs the rays onto the desired incremental areas of the image 22. The scaling of each ray is performed so that the cross sectional area of the ray is approximately equal to the size and configuration of the individual information structures of the image 22. The rays are directed onto the original image to form a vertical plane in each horizontal scan line.

Rays R1 through R5 then pass through their respective incremental areas of the image 22 where their intensity is modulated by the density of the information forming structure therein, and pass through lens 70 which directs the rays on binary detector 72 where the measurement of the modulation of the rays occurs. Lens system 68 and 70 thus comprise the aperture of the sensor 64 discussed hereinbefore, and may be adjustable by known means under control of such as controller 36 through lead 76 to change the cross sectional areas of the rays and thereby the size or configuration of the incremental areas scanned.

Of course the operations of the scaling and directing may be performed by lens system 68 and 70 otherwise than has been explained such as with both lenses serving to perform the scaling and directing operations.

Figure 2:
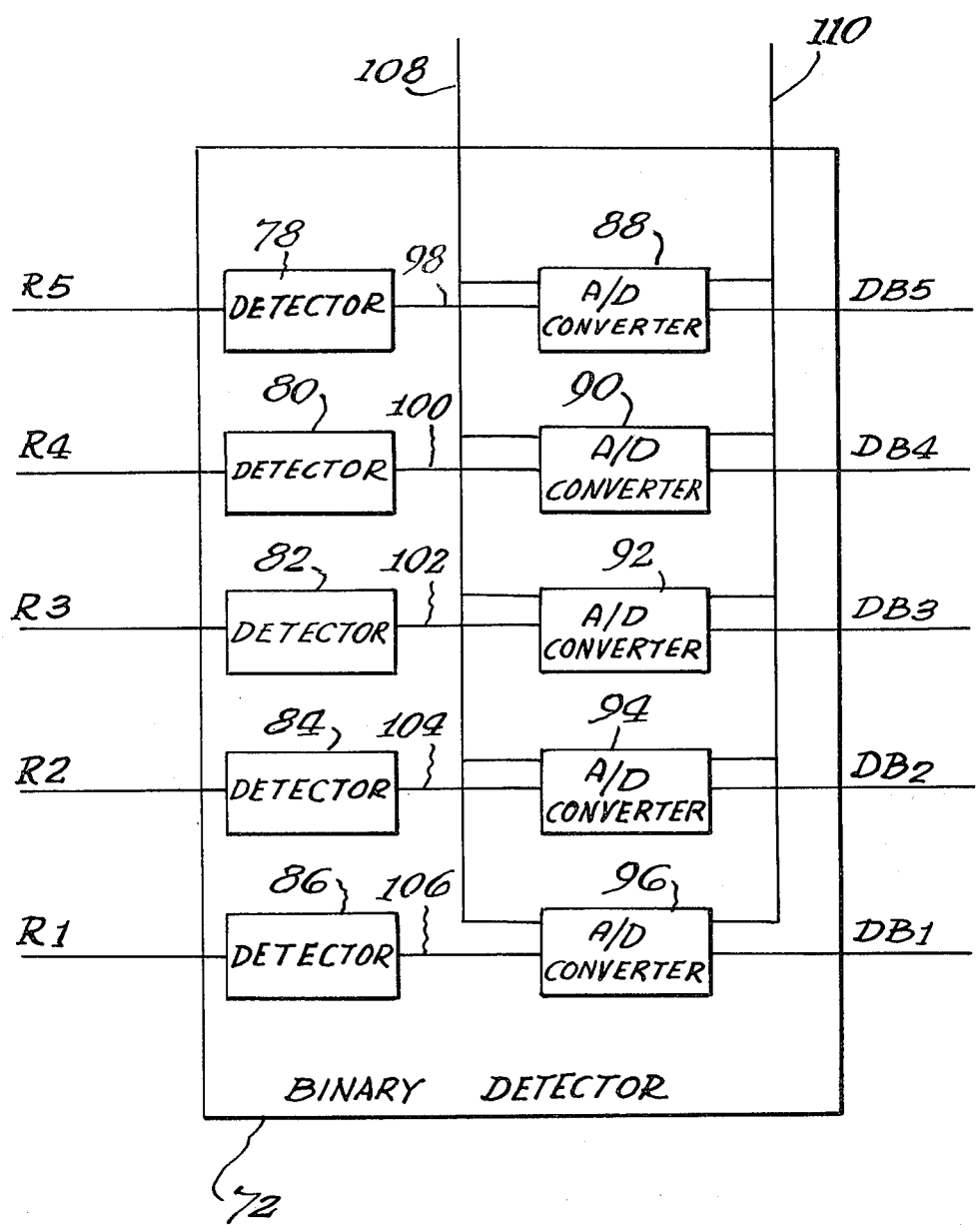
FIG. 2 is a more detailed block diagram of the binary detector portion of the diagram of FIG. 1.

Referring to FIG. 2, binary detector 72 comprises five detectors 78–86, one for each of rays R1 through R5, which may be constructed from such as semiconductor charge detection devices. Each of rays R1 through R5 strikes one detector and produces an analog electrical signal corresponding to the intensity or magnitude of the radiant energy remaining in the ray after the ray has passed through the image 22. These electrical signals are applied to analog to digital converters 88 through 96 through leads 98 through 106 respectively.

Each analog to digital converter 88–96 converts the signal from its respective detector into a binary data signal which is then output from binary detector 72, the outputs appearing as data bits DB5–DB1 respectively. For performing the conversion, each analog to digital converter includes an adjustable threshold level value signal circuit. An analog density value signal from a detector above the threshold level value is converted to a binary data bit of one sense such as a "1" while an analog density value signal from the detector below the threshold level value is converted to a binary data bit of the other or opposite sense such as a "0". The threshold level values of all the converters are controlled by such as controller 36 through lead 108. Thus controller 36 by controlling the threshold level values of the converters is able to bias the count of logic states "1" and "0" which are derived from the analog signals produced from the original image 22. Biasing this count means that more "1's" or "0's" will be produced from the original image than would be indicated by the mean relative density of the entire original image 22. Converters 88 through 96 produce a second data bit output which is coupled to controller 36 through lead 110 which although represented by a single line may include an individual lead from the output of each converter. Controller 36 thus may control the data output of the scanning apparatus with respect to the mean relative density of original image 22 by controlling the threshold level values of the converters in response to the count of logic states output thereby and by controlling the size and configuration of the aperture as explained hereinbefore.

Data bits DB1 through DB5 are applied to output buffer 102 which gates the output data from the scanning apparatus 20 on leads L1 through L5 under the control of controller 36 by way of lead 114.

Synchronization of the sensing of separate incremental areas of the original image with the movement of the original image relative to the sensor may of course occur otherwise than has been explained in connection with the preferred embodiment. Such other synchronization may occur by continuously applying rays of radiant energy to the original image and gating the analog signals or selecting the digital signals from detector 72 in timed relationship with movement of the original image.

At this point it would be beneficial to examine more closely the modulation of rays R1–R5 as they pass through original image 22 and the binary decisions made in detector 72 which determine the sense of the data bits produced from the modulated rays.

Referring to FIGS. 5, 6 and 7, FIG. 5 illustrates a portion of original image 22 having a plurality of individual information structures formed by precipitated and developed silver such as grains 116–130. Incremental areas of the original image 22 are sensed by rays of radiant energy in sequential sensing positions such as positions $P_3$, $P_4$, $P_5$ and $P_6$ of each horizontal scan line such as A, B and C. The cross sectional area of each ray R1–R5 as it passes through image 22 is represented in FIG. 5 by a circle, the circles accordingly delineating the perimeters of the sensed incremental areas. The sensed incremental areas are shown as approximately the same size as the information forming structures and are interleaved in adjacent sensing positions to sense effectively the entire area of the original image. Thus in the preferred embodiment, in the odd numbered positions such as $P_3$ and $P_5$ of every scan line, rays R1, R3 and R5 are formed and sense the density of image 22 while in the even numbered positions such as $P_4$ and $P_6$ rays R2 and R4 are formed and sense the density of image 22.

FIG. 6 is a chart of the density values of incremental areas of image 22 sensed by rays R1–R5 in scan line B of FIG. 5. The value of the density of an incremental area of image 22 sensed by each ray is plotted with a small point for each position sensed by the ray. Associated with each ray in FIG. 6 is a threshold level value set at about 50% of the sensed density value so that a density value of image 22 greater than the threshold value produces a "1" data bit in binary detector 72 while a density value less than the threshold value produces indicating the presence of one individual information forming structure a "0" data bit indicating the absence of one individual information forming structure.

Silver grain 116 (an individual information forming structure) in FIG. 5, almost totally occupies the incremental area sensed by ray R1 in position $P_3$ of scan line B. Thus ray R1 is substantially modulated by crystal 116, and the sensed density value of this incremental area corresponds in FIG. 6 to point 130. Because the sensed density value of this incremental area is well above the threshold level value established for ray R1, binary detector 72 produces a "1" data bit therefrom.

Grains 118 and 120 respectively occupy the areas sensed by rays R3 and R5 in position $P_3$ of scan line B to an extent just greater than about 50% of the total incremental area sensed. Ray R3 and R5 are modulated by grains 118 and 120 accordingly and the sensed density values are represented in FIG. 6 by points 132 and 134 respectively. Points 132 and 134 are just above the threshold level values of their associated rays and accordingly binary detector 72 produces "1" data bits therefrom.

Grain 122 occupies a large part of the incremental area sensed by ray R2 in position $P_4$ of scan line B and modulates ray R2 accordingly. This is represented in FIG. 6 by point 136 which is well above the threshold value for ray R2 and accordingly a "1" data bit is produced by binary detector 72. Grain 124 occupies only a slight part of the area sensed by ray R4 in position $P_4$ of scan line B and modulates ray R4 to only a slight extent. This is represented by point 138 in FIG. 6 which is well below the threshold value for ray R4, so binary detector 72 produces a "0" data bit therefrom.

Grain 126 occupies the area sensed by ray R1 in position $P_3$ of line B to an extent just greater than about 50% of the total area sensed and modulates ray R1 accordingly. This is represented by point 140 in FIG. 6 which, being above the threshold value of ray R1 causes a "1" data bit to be produced in binary detector 72. Ray R3 in position $P_5$ of line B is not modulated by any grain and its sensed density value is accordingly represented in FIG. 6 by point 142 which is well below the threshold value which causes a "0" to be produced by detector 72. Grain 128 occupies just under about 50% of the area sensed by ray R5 in position $P_5$ of line B and modulates ray R5 accordingly. This is represented by point 144 in FIG. 6 which is just below the threshold value of ray R5, and a "0" data bit is produced by detector 72 therefrom.

Ray R2 in position $P_6$ of line B is not modulated by any grain and its sensed density value, represented by dot 146 in FIG. 6 causes a "0" data bit to be produced in detector 72. Grain 124 occupies the area sensed by ray R4 in position $P_6$ of line B to an extent greater than 50% and modulates ray R4 accordingly. This is represented in FIG. 6 by point 148 which being well above the threshold value causes a "1" data bit to be produced by detector 72.

Binary detector 72 produces a count of binary data bits corresponding to the relative density of the entire original image 22 from which the reproduced image is formed. As will be explained more fully hereinafter, the data bits produced will be used to form areas of equal density in the imaged reproduction, all "1" data bits producing like areas of total black and all "0" data bits producing like areas of total white. Thus by producing from detector 72 more or less of "1" data bits relative to the number of "0" data bits, one may change the density of the reproduced image, respectively from dark to light. This is achieved by raising or lowering the adjustable threshold level value for several rays in detector 72 while maintaining constant the apertures of the rays.

A statistically valid count of the binary data bits for the original image 22 is achieved through two related adjustments of the sensing device. The first adjustment is setting the threshold level value to an amount corresponding to the mean of the relative density of the original image, i.e., setting the threshold level value to an amount halfway between the extremes of relative density of the original image which may be sensed.

For example, take the case where the original image 22 is a transparent plastic film carrying the individual information structures or silver grains. A ray such as R3 in position $P_5$ of FIG. 5 senses no grains but is modulated by some amount such as 10% of its intensity by the plastic carrier. Thus the minimum relative density value sensed is not 0% (or no grain) but 10% taking into account the density of the plastic carrier. On the other extreme, the incremental area sensed by one ray may not coincide exactly with one grain due to configuration or size differences therebetween. This will allow at least some of the sensing ray such as 5(95% modulation) to pass to the detector. Such a case is shown in FIG. 5 by Ray R1 in position $P_3$. The mean of these two relative values is calculated as:

$$\frac{95\% - 10\%}{2} = 42.5\%$$

Thus the calculated mean of the relative densities of the original image is 42.5% and the threshold level value is set to 42.5% of its maximum value.

The other part of achieving the statistically valid count of the binary data bits is to adjust the apertures to settings approximately the size and configuration of the individual information structures. In the preferred embodiment, for silver salt crystal film such as TRI-X brand film of Kodak Corporation, the size of the incremental area sensed will typically be about 7 microns in diamenter or less to yield a good statistical representation of the density of the original image. For different size information structures, the size of the incremental areas will have to be adjusted accordingly, as will the spacing of the incremental areas as is well known in sampling theory.

The statistically valid count of the binary data bits is of course the summation of the statistical representations of each of the scanned or sensed incremental areas as determined by the adjustment of the apertures and threshold level values.

The scanning apparatus and imaging apparatus are constructed and arranged so that there is a one to one correspondence between incremental areas of the original image and the reproduced image, and so that the statistically determined density value of one sensed area of the original image is used to form one binary element (black or white) in the corresponding imaged area of the reproduced image.

This one to one correspondence eliminates the need for any gray scale conversion between the scanning and the imaging and with parallel processing in both of the scanning and imaging processes enables a rapid on-line reproduction of the original image.

Figure 3:
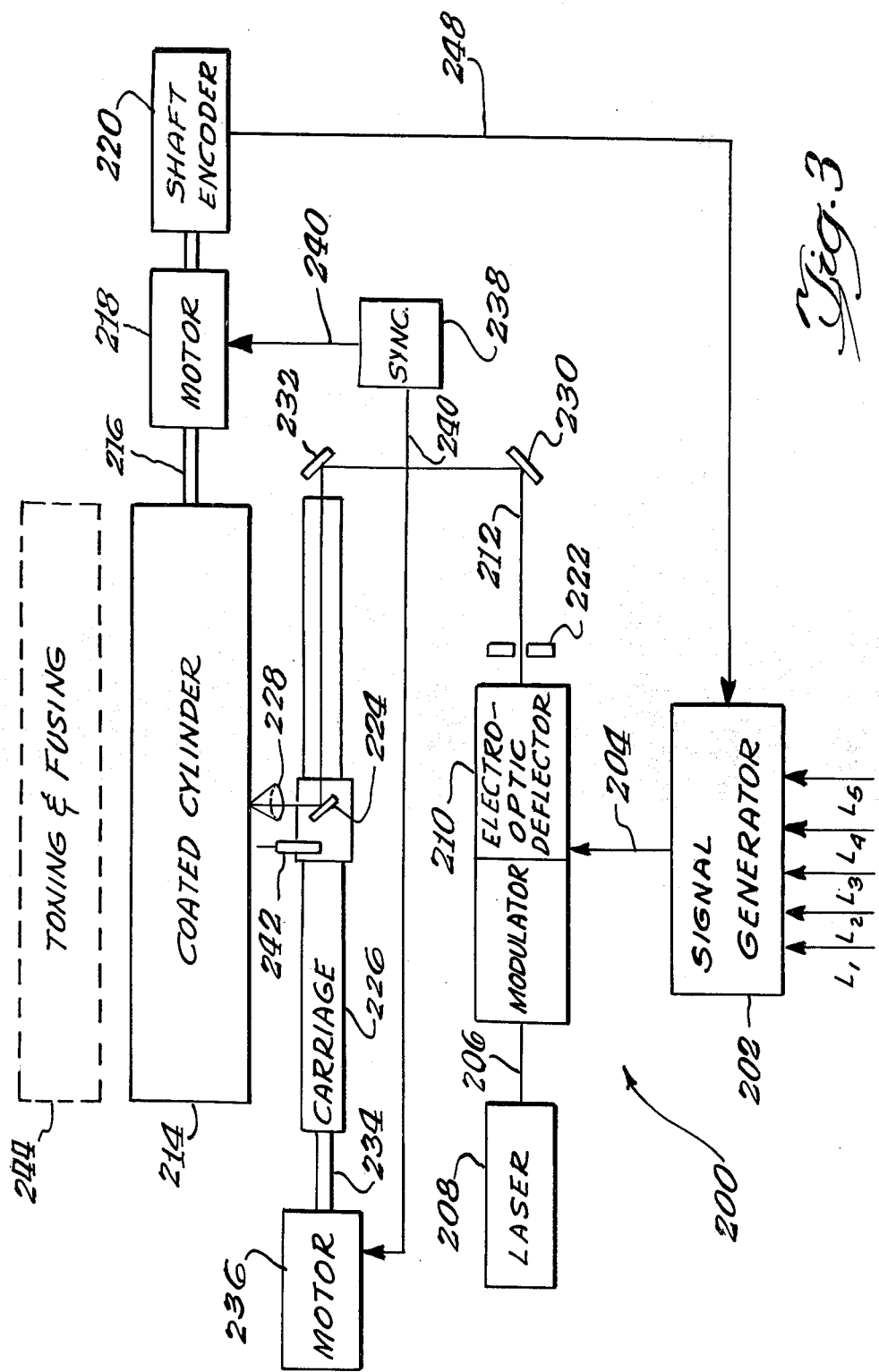
FIG. 3 is a block diagram of an imaging apparatus for making printing plates that is constructed in accordance with the invention and uses the method of the invention.

Referring to FIG. 3, the imager apparatus of the invention is indicated generally by the reference character 200. One may visualize the imager best by considering that it performs the conversion from the binary data bits to formed binary elements on the electrophotographic member thereby reproducing the original image. The imager charges the member, modulates a source of radiant energy such as a laser with the binary data bits and applies the modulated laser beam to the member to discharge and leave charged incremental areas of the member, the discharged and charged areas forming the latent information of the reproduced image. The member then may be toned and fused as desired and subsequently may be processed to form directly a lithographic printing plate.

The data signals on leads L1–L5 of imager 200 may be received directly from scanner 20 or may be received alternatively from a store or a processor as desired.

The data signals on leads L1–L5 are applied to signal generator 202 which produces signals on channel 204 to control the laser beam. The information produced by signal generator 202 is used to cause deflection of a laser beam 206, generated by a laser 208 and passed through an electro-optical deflector 210. This results in a radiant energy pattern of beams which may be as little as a single beam indicated at 212. These beams or rays 212 perform the actual imaging which has been mentioned and are directed onto the rotating cylinder 214.

The cylinder 214 is an electrophotographic member which may be in the form of a sheet of metal or synthetic resin film such as polyester coated with the photoconductive coating which is described in the above mentioned patent. It is shown here mounted on a mandrel (not shown) carried on a shaft 216 driven by a motor 218 which at the same time drives a signal producing device which is here designated shaft encoder 220. The function of the shaft encoder 220 is to provide a registration signal or signals which give information concerning the exact rotational position of the shaft 216 at all times and therefrom the registration of the incremented areas as will be explained hereinafter. This provides a control which is required to assure proper synchronization of the signals at 204 with the rotation of the cylinder 214.

The output beam or beams from the deflector 120 will be modified by the beam stop 222 so that all deflected beams appear at 212. The undeflected main beam and such harmonic or stray energy as are undesirable are removed. The composite beam 212 is guided to a mirror 224 that is mounted on a carriage 226 and reflected by the mirror 224 through a suitable optical system such as a lens 228 onto the surface of the cylinder 214. In the course of its guidance, the composite beam 212 may be bent by mirrors such as 230 and 232 or by prisms and the like. The carriage 226 is driven by a lead screw 234 that is rotated by a motor 236. The motor 236 and the motor 218 are required to be rotated at speeds having a specific relationship in order that the image be laid down properly on the cylinder 214. A suitable synchronizing device is provided for this purpose as indicated by the block 238 and an electrical connection 240 extending between the motors. Synchronization can be achieved by a mechanical connection or, if desired, the same motor may drive both the carriage 226 and the shaft 216 through suitable gear boxes.

In the course of imaging it is to be understood that the carriage and the cylinder will normally be enclosed against ambient light. The carriage 226 is provided with a charging device which is indicated symbolically at 242. After the latent image has been formed by the incidence of the laser composite beam 212, the cylinder is toned and fused by a device which is indicated at 244. This may be done after the entire cylinder has been imaged with the latent image or may be done progressively while imaging is being effected by the laser beam 212.

Figure 4:
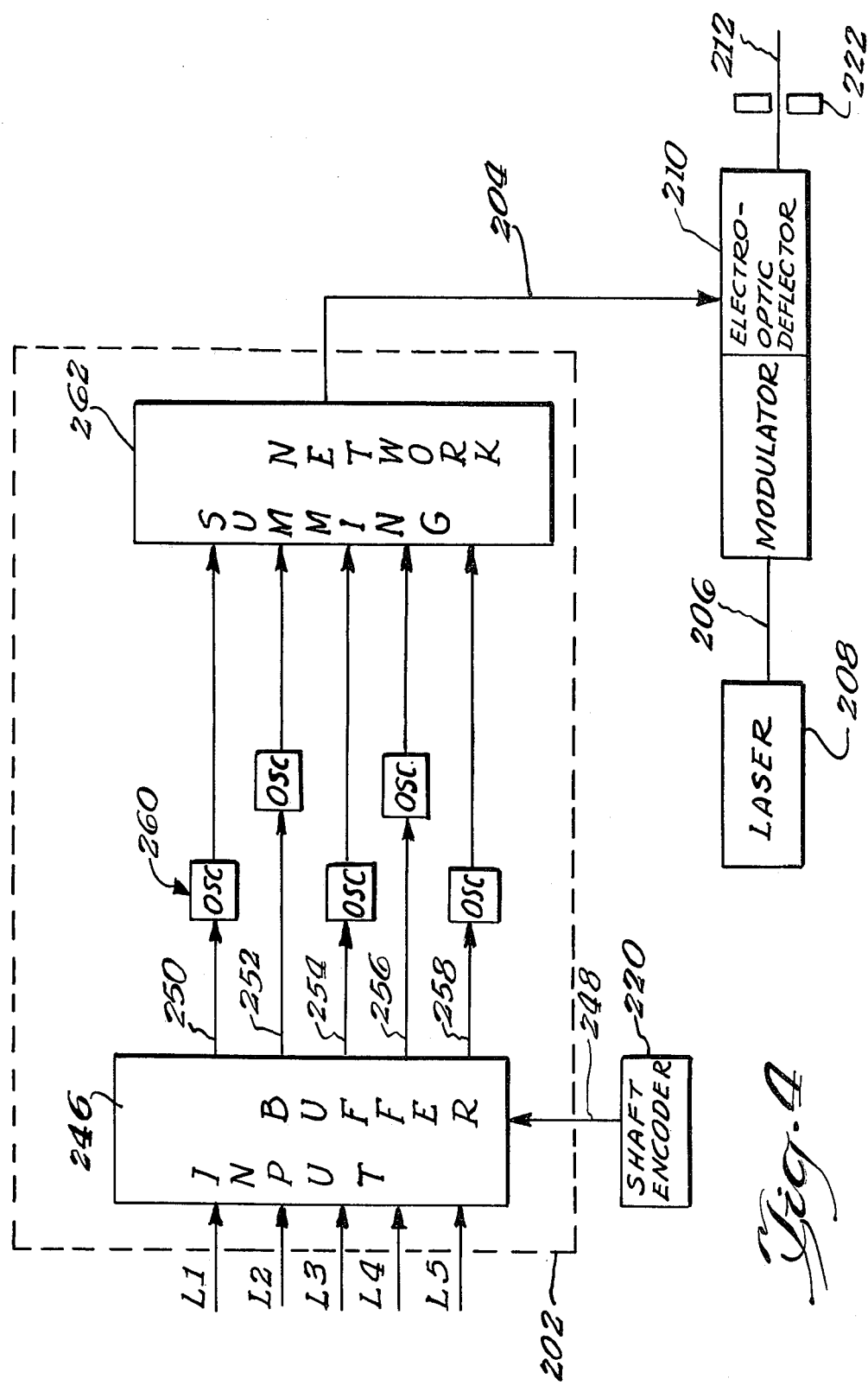
FIG. 4 is a more detailed block diagram of the signal generator portion of the diagram of FIG. 3.

In FIG. 4 the signal generator 202 is shown in more detail than in FIG. 3. The shaft encoder 220 is coupled to an input buffer 246 by lead 248, and is used to gate the data bits on leads L1 through L5 to the input buffer in synchronization with the rotation of cylinder 214, this gating occurring when incremental areas of the member are in registration with the composite beam 212. When the data bits on leads L1 through L5 are gated into the input buffer 246 they are immediately presented at outputs 250 through 258, the logic sense of the outputs 250 through 258, "1" or "0", respectively turning off or on oscillators 260. Oscillators 260 when turned on produce different high frequency oscillating signals which are summed in summing network 262 and applied to electro-optic deflector 210 through channel 204. Each of the different signals produced by oscillators 260 is used by electro-optic deflector 210 to split or deflect one secondary ray from the main laser beam 206 through stop 222, the split rays achieving what has been previously called a composite beam 212.

Composite beam 212 is made up of rays corresponding to the "0" binary data signals from the scanning apparatus which rays expose or discharge elements in incremental areas of the charged electroconductive member. The "1" binary data signals from the scanning apparatus do not produce any rays in composite beam 212 and accordingly they do not expose or they leave charged elements in the incremental areas of the charged electrophotoconductive member. This is illustrated in FIG. 7. The circles contained therein represent the imaged incremental areas of the electrophotoconductive member, the black circles representing elements or charged areas corresponding to a "1" binary data bit from the scanner and the white circles representing discharged areas corresponding to a "0" binary data bit.

The elements formed in positions P3 through P6 in FIG. 7 correspond to the sensed density values 130–148 of FIG. 6 discussed hereinabove. Thus, in position P3, charged elements corresponding to the sensed density values above the threshold level values (130, 132 and 134) are formed by imaging rays 1, 3 and 5. In position P4, elements are formed by imaging rays 2 and 4 corresponding to the sensed density values 136 and 138 of FIG. 6, respectively a charged incremental area and a discharged incremental area. In position P5 of FIG. 7, a charged incremental area is left by ray 1 corresponding to the sensed density value 140 while discharged incremental areas are formed by rays 3 and 5, respectively, corresponding to the density values 142 and 144. In position P6, the discharged incremental area is formed on the electrophotoconductive member by ray 2 corresponding to the sensed density value 146 while a charged area is left by ray R4 corresponding to the sensed density value 148.

Likewise, the remaining elements formed in positions P1 and P2, and P7 through P9 of FIG. 7 correspond to the sensed density values represented in positions P1 and P2 and positions P7 through P9 of FIG. 6. The sensed density values and formed elements of positions P1, P2, P7, P8 and P9 of FIG. 7 are formed in a like manner to that which has been described for positions P3–P6.

The formed elements of FIG. 7 are shown in a hexagonal configuration to illustrate that the binary data bits from the scanning apparatus may be stored before imaging in a hexcell format using compressed data handling techniques and may be used to form the images on the electrophotoconductive member in a hexcell format.

It will be observed that in FIG. 7 each imaged element is of approximately equal size with each charged element and represents one sensed individual information structure of the original image. Thus the reproduced image is a statistical reproduction of the information forming structure of the original image with every imaged element having an equal density of one sense or the other.

No dimensions for the imaged elements are expressed for the preferred embodiment herein since the size of the incremental areas may be adjusted as desired to scale the size of the reproduced image.

In FIGS. 5 and 7 the circles respectively representing the cross section of the rays passing through the image 22 or the sensed incremental areas and the formed elements or the imaged incremental areas are shown as being spaced from one another for clarity of the drawings. In the preferred embodiment these circles or sensed and imaged incremental areas may be touching or even overlapping to sense and image the entirety of the information structure.

Adjustment of the aperture setting and the threshold level value to produce a statistically valid count is principally for calibration. The aperture setting generally is set to the size and configuration of the individual information forming structure to provide for the statistically valid representation of density. The threshold level adjustment serves to calibrate the sensor to the proper density value of the original image or as desired. Of course, both the adjustment of the aperture and threshold level may be made as desired to artificially modify the statistically valid count.

As understood, when the electrophotographic member is removed from the apparatus it already has the toner fused thereon. It could be based upon metal or transparent plastic. To make it into a printing plate the electrophotographic member is immersed in a bath of some material which will render the toner (charged) elements oil attractive but water repellant (hydrophobic) while the nontoned (discharged) areas are rendered oil repellant but water attractive (hydrophylic). The member is provided with punched holes or slots to enable it to fit onto a printing press of the offset lithographic type and used to print the graphics which it carries. In the case of color the set of separations are arranged to print in registration. Various means for ensuring registration can be incorporated into the plates but this is not concerned with the invention.

The invention is especially adaptable for color because the original image can be scanned and binary data generated through color filters without making color separations, with the separate printing plates being made from the binary data rather than from physical screened separations.

The preferred form of the invention has the original image mounted in a flatbed scanner apparatus and the electrophotographic member mounted on a rotating drum of the imager apparatus. These provide convenient ways of scanning the original image and imaging the electrophotographic member. It is feasible, however, to mount the original image on a rotating drum and the electrophotographic member in a flatbed apparatus. The adaptation of the invention to such alternative mountings is concerned only with the mechanical problems which occur to meet the requirements of the scanning rays over the original image and the imaging rays over the electrophotographic member and picking up registration signals to locate the rays at all times. The invention covers alternative structure of this type within its ambit as should be understood.

It should be clear that many modifications and forms of the invention are capable of being effected without departing from the spirit or scope of the invention as defined in the appended claims.

What it is desired to secure by Letters Patent of the United States:

1. A method of reproducing a continuous tone original image on an electrophotographic member with an array of discharged elements of such configuration and placement to enable the member to be utilized for producing a graphic image upon a receptor by printing, the original image having a relative density and being comprised of a plurality of individual information forming structures having a size and a configuration, said structures being irregularly spaced apart in said image, the method comprising:
  A. moving a sensor and the original image relative to one another in a predetermined pattern with the sensor sensing one by one the presence and absence of individual ones of the information forming structures of the original image in sequential incremental areas thereof;
  B. producing from the sensor a series of binary data bits with each bit binarily representing a sensed density value of individual ones of said information forming structure in one incremental area of the original image and the series of bits being representative of the entire original image;
  C. the sensor including at least one aperture through which the density values of individual ones of the structures in incremental areas of the original image are sensed and further including at least one threshold level value signal of the sensed density values such that a sensed density value above the threshold value signal produces a bit of one sense and a sensed density value below the threshold value signal produces a bit of the other sense;
  D. adjusting at least one of the aperture and the threshold level value of the sensor to produce a statistically valid count of the series of binary data bits corresponding to the relative density of the original image; and
  E. imaging the electrophotographic member essentially to reproduce the proper location of and the presence and absence of individual ones of the information forming structures of the continuous tone original image on the member by forming on a charged suface of the member a binary element for each binary data bit in the series of binary data bits, each element being formed in an incremental area of the member surface corresponding to the sensed incremental area from which the binary data bit producing that element was produced, and each binary element being formed by leaving charged an incremental area of the charged member in response to a bit of the one sense and discharging an incremental area of the charged member in response to a bit of the other sense.

2. The method as claimed in claim 1 in which moving the original image and the sensor relative to one another includes moving the original image in a predetermined pattern in a flatbed scanner apparatus which mounts the original image in a plane and fixing the movement of the sensor.

3. The method as claimed in claim 2 in which moving the original image and the sensor relative to one another includes encoding the positions of the scanned incremental areas of the original image.

4. The method as claimed in claimed 2 in which moving the original image in a flatbed scanner apparatus includes controlling the movement of the original image in at least a horizontal and vertical plane perpendicular to the plane of the original image.

5. The method as claimed in claim 4 in which moving the original image and the sensor includes moving the original image in vertically sequential horizontal scan lines.

6. The method as claimed in claim 1 in which sensing the individual information forming structures of the original image includes providing at least one ray of radiant energy, applying the ray to the original image where the information structure of the original image modulates the energy content of the ray and directing the modulated ray onto a detector producing the series of binary data bits.

7. The method as claimed in claim 6 in which providing at least one ray includes providing a source of substantially white light, directing light from the source to a receiving end of a light guide, emitting light from an opposite end of the light guide adjacent the original image, and gating the emitted light in synchronism with the movement of the original image and the sensor relative to one another.

8. The method as claimed in claim 7 in which gating the emitted light in synchronism with the movement of the original image and sensor includes allowing a ray of light to pass to the aperture when an incremental area of the original image is in registration with the aperture.

9. The method as claimed in claim 7 in which said source has a circumference and provides light in at least a radial pattern to said circumference and directing light from the source to a receiving end of a light guide includes arranging the receiving end of the light guide at the circumference of the source.

10. The method as claimed in claim 6 in which applying the ray to the original image and directing the modulated ray onto a detector includes passing the ray through said aperture which includes one and another lens.

11. The method as claimed in claim 10 in which applying the ray to the original image includes scaling the cross sectional area of the ray to the size and configuration of an incremental area of the original image and passing the ray through one of the lenses to the original image.

12. The method as claimed in claim 10 in which directing the modulated ray to the detector includes passing the modulated ray through the other of the lenses.

13. The method as claimed in claim 1 in which producing the series of binary data bits includes receiving rays of radiant energy which have been modulated by the information structure of the original image, converting each of the rays into a separate analog electrical signal, converting each of the analog signals into a digital signal and outputting the digital signals as the series of binary data bits.

14. The method as claimed in claim 13 in which converting each of the analog signals into a digital signal includes comparing the analog signals to the threshold level value.

15. The method as claimed in claim 13 further including encoding the relative position of the original image relative to the sensor to relate the position of incremental areas of the original image to their respective binary data bits.

16. The method as claimed in claim 1 in which adjusting the sensor includes adjusting the aperture to a setting approximating the size and configuration of the individual information forming structures of the original image and adjusting the threshold level value to an magnitude equal to the mean of the relative densities of the entire original image.

17. The method as claimed in claim 16 in which the aperture includes a lens system and in which adjusting the aperture includes adjusting the lens system to scale the size and configuration of the incremental areas of the original image being sensed.

18. The method as claimed in claim 17 in which adjusting the aperture includes adjusting the lens system in response to the count of the binary data bits to bias the count.

19. The method as claimed in claim 16 in which adjusting the aperture includes adjusting the aperture in response to the count of the binary data bits to bias the count.

20. The method as claimed in claim 16 in which adjusting the threshold level value includes adjusting the threshold level value in response to the count of the binary data bits to bias the count.

21. The method as claimed in claim 1 in which imaging the electrophotographic member includes encoding the positions of the imaged incremental areas of the member, charging the member, modulating a source of radiant energy in response to binary data bit and applying the modulated radiant energy to the member to discharge an incremental area of the member.

22. The method as claimed in claim 21 in which modulating the source of radiant energy includes gating rays of radiant energy from the source in response to the sense of the binary data bits and the position of imaged incremental areas of the member.

23. The method as claimed in claim 22 in which gating rays of radiant energy from the source includes blocking a ray from the source in response to a binary data bit of the one sense and passing a ray from the source in response to a binary data bit of the other sense.

24. The method as claimed in claim 1 further including toning the charged areas of the member with a toner, fusing the toner to the member, treating the toned areas to render them hydrophobic and treating the non-toned areas to render them hydrophilic so that the treated member may be used directly thereafter as a printing plate.

25. An apparatus for reproducing a continuous tone original image on an electrophotographic member with an array of discharged elements of such configuration and placement to enable the member to be utilized for producing a graphic image upon a receptor by printing, the original image having a relative density and being comprised of a plurality of individual information forming structures having a size and a configuration, said structures being irregularly spaced apart in said image, the apparatus comprising:

A. drive means for moving sensor means and the original image relative to one another in a predetermined pattern with the sensor means sensing one by one the presence and absences of individual ones of the information forming structures of the original image in sequential incremental areas thereof;

B. said sensor means producing a series of binary data bits with each bit binarily representing a sensed density value of individual ones of the information forming structure in one incremental area of the original image and the series of bits being representative of the entire original image;

C. the sensor means including at least one aperture means through which the density values of individual ones of the structures in the incremental areas of the original image are sensed and further including circuit means operable to produce at least one threshold level value signal of the sensed density values such that a sensed density value above the threshold value signal produces a bit of one sense and a sensed density value below the threshold value signal produces a bit of the other sense;

D. said sensor means including adjustment means coupled to the aperture means and the circuit means for adjusting at least one of the aperture means and the circuit means to produce a statistically valid count of the series of binary data bits corresponding to the relative density of the original image; and E. imager means for imaging the electrophotographic member essentially to reproduce the proper location of and the presence and absence of individual ones of the information forming structures of the continuous tone original image on the member by forming on a charged surface of the member a binary element for each binary data bit in the series of binary data bits, each element being formed in incremental area of the member surface corresponding to the sensed incremental area from which the binary data bit producing that element was produced, and each binary element being formed by leaving charged an incremental area of the charged member in response to a bit of the one sense and discharging an incremental area of the charged member in response to a bit of the other sense.

26. The apparatus as claimed in claim 25 in which said drive means include a flatbed scanner apparatus including a frame in which said original image is mounted and movable in a plane, horizontal and vertical motors coupled to said frame to move the frame in independent horizontal and vertical directions of said plane, horizontal and vertical position encoders connected to the frame to independently encode the positions of said frame in the horizontal and vertical directions and therefrom the positions of sensed incremental areas of the original image, and mounting means to which said sensor means are attached for fixedly mounting said sensor means while said frame is moved in said plane relative to the sensor means.

27. The apparatus as claimed in claim 26 further including control means coupled to said motors and encoders, said control means including a predetermined pattern of scanning of the original image for controlling said motors in response to said pattern and said encoders, to move the frame carrying the original image in the predetermined pattern relative to the sensor means.

28. The apparatus as claimed in claim 25 in which there are encoder means connected to the original image to produce registration signals when incremental areas of the original image to be scanned are in registration with the aperture means, and the sensor means include modulator means for gating individual rays of radiant energy from a source to said aperture means in synchronization with the encoder registration signals.

29. The apparatus as claimed in claim 28 in which the source provides rays of radiant energy which are of substantially white light.

30. The apparatus as claimed in claim 25 in which said aperture means and circuit means are adjustable, said adjustment means adjusting said aperture means to a setting approximately the size, sampling interval, and configuration of the individual information forming structure of the original image and said adjustment means adjusting said threshold level value signal of said circuit means to a magnitude equal to the mean of the relative densities of the entire original image.

31. The apparatus as claimed in claim 30 in which said aperture means include a lens system including two lenses, one lens receiving rays of radiant energy from a source and directing the rays onto incremental areas of the original image where the rays are modulated by the information structure of the original image and the other lens receiving the modulated rays from the original image and directing the modulated rays onto detector means.

32. The apparatus as claimed in claim 31 in which the original image is transparent and the lenses are located on opposite sides of the original image.

33. The apparatus as claimed in claim 31 in which the lens system is adjustable to scale the size and configuration of the cross section of the rays applied to the original image and therefrom the size and cross section of the incremental areas of the original image modulating the rays, and the adjustment means adjusting the cross section of the rays by adjusting the lens system to a size and configuration approximating the information forming structures of the original image.

34. The apparatus as claimed in claim 33 in which the adjustment means include controller means, coupled to the series of binary data bits for controlling the cross section of the rays applied to the original image by the lenses in response to the binary data bits to bias the count.

35. The apparatus as claimed in claim 31 in which said rays of radiant energy are of substantially white light.

36. The apparatus as claimed in claim 31 in which said adjustment means include controller means, coupled to the series of binary data bits to adjust the threshold level value in response to the count of the binary data bits to bias the count.

37. The apparatus as claimed in claim 25 in which said sensor means include radiant energy detector means receiving radiant energy rays originally of a cross sectional size and configuration approximating the information forming structure of the original image but modulated by the information structure of the original image and producing therefrom analog signals corresponding in magnitude to the strength of the modulated rays and converter means receiving the analog signals from the detector means and producing digital signals therefrom, the converter means comparing the analog signals to the threshold level value signal and producing a binary bit of one sense when the analog signal is greater in magnitude than the threshold level value signal and producing a binary bit when the analog signal is less in magnitude than the threshold level value signal.

38. The apparatus as claimed in claim 37 in which the detector means include semiconductor charge detection devices which receive the modulated rays.

39. The apparatus as claimed in claim 37 in which the threshold level value signal is adjustable and the adjustment means adjusting the threshold level value signal to a magnitude equal to the mean of the sensed relative densities of the original image.

40. The apparatus as claimed in claim 37 in which the threshold level value signal is adjustable and the adjustment means include controller means coupled to the series of binary data bits to control the magnitude of the threshold level value signal in response to the series of binary data bits.

41. The apparatus as claimed in claim 25 in which the imager means include:
   charging means for applying an electrical charge on the surface of the electrophotographic member,
   source means for applying rays of radiant energy to the electrophotographic member to discharge incremental areas thereof,
   drive means for moving the electrophotographic member relative to the source means in a predetermined pattern which is the same as the pattern in which the original image is sensed,
   encoder means for producing registration signals when incremental areas of the electrophotographic member are moved into registration with the source means, and
   modulation means for blocking the application of a ray of radiant energy to the electrophotographic member in response to a binary data bit of the one sense and for allowing the application of a ray of radiant energy to the electrophotographic member in response to a binary data bit of the other sense, both blocking and allowing application of the ray to the electrophotographic member being performed in synchronization with the registration signals and thereby leaving charged and discharging incremental areas of the electrophotographic member.

42. The apparatus as claimed in claim 41 in which the drive means include a rotatable drum upon the circumference of which the electrophotographic member is mounted and a carriage movable longitudinally alongside the circumference of the drum adjacent the member, the drive means including a motor rotating the drum and a motor moving the carriage longitudinally along the drum adjacent the member in synchronism with the rotation of the drum.

43. The apparatus as claimed in claim 41 in which the source means include a source of light guided to the electrophotographic member by mirrors.

44. The apparatus as claimed in claim 43 in which the source of light is a laser.

45. The apparatus as claimed in claim 41 in which the modulator includes:
   oscillators which are activated by the bits of the other sense to provide high frequency signals therefrom, and
   an electro-optic deflector in the path of the rays of radiant energy from the source means, to deflect the rays through a beam stop and then to the electrophotographic member in response to the high frequency signals.

46. A method of reproducing a continuous tone original image comprised of a plurality of individual information structures irregularly spaced apart, on an electrophotoconductive member to enable the member to be made into a printing plate for printing the original image, the method comprising:

producing binary data bits from sequentially scanned incremental areas of the original image, each binary data bit being a statistically valid representation of the relative density of individual ones of the information structures contained in one scanned incremental area, the sum of the binary data bits being a statistically valid count of the data bits relative to the density of the original image, and a binary bit of one or the other sense representing, respectively, the statistical presence and absence of individual ones of the information forming structures in one scanned incremental area; and forming binary elements representing the proper location of and the presence and absence of individual ones of said information forming structures in imaged incremental areas of the electrophotographic member in response to the binary data bits, each binary element being formed in response to one data bit and in the same sense as the data bit, and each binary element further being formed in one imaged incremental area corresponding in location to the sensed incremental area from which the binary data bit corresponding to that element was produced.

47. The method as claimed in claim 46 in which producing binary data bits includes scanning the original image with a plurality of rays of radiant energy, modulating the radiant energy of each ray with the density of the information structure in one sensed incremental area, detecting the modulated energy of each ray and outputting a binary data bit in response to the modulated energy of each ray.

48. The method as claimed in claim 47 in which scanning the original image includes adjusting an aperture, through which the rays are passed to the original image, to a setting relative to the size and configuration of the information structure of the original image; detecting the modulated energy of each ray includes converting the modulated energy of each ray into an analog electrical signal having a magnitude related to the modulated energy of the ray; and outputting a binary data bit includes comparing the analog electrical signal to a threshold level value signal and producing a binary data bit of one sense when the magnitude of the analog signal is greater than the threshold level value signal and producing a binary data bit of the other sense when the magnitude of the analog signal is less than the threshold level value signal.

49. The method as claimed in claim 48 in which adjusting an aperture includes adjusting the cross section of the rays by adjusting the aperture to a size and configuration approximately the size and configuration of the information structure and comparing the analog signal to the threshold level value signal includes adjusting the threshold level value signal to a magnitude equal to the mean of the relative densities of the scanned incremental areas.

50. The method as claimed in claim 46 in which forming binary elements includes charging the surface of the member, providing rays of radiant energy which are appliable to the charged surface of the member, blocking the application of a ray to the member in response to a data bit of one sense to leave charged an imaged incremental and form a binary element of one sense, and allowing the application of a ray to the member in response to a data bit of the other sense to discharge an imaged incremental area and form a binary element of the other sense.

51. The method as claimed in claim 50 further including moving the member relative to the rays of radiant energy and producing registration signals when the imaged incremental areas are in registration with the rays, and synchronizing said blocking and allowing the application of a ray with said registration signals to form the binary elements in the incremental areas.

52. The methods as claimed in claim 51 in which producing binary data bits includes scanning the scanned incremental areas of the original image in a predetermined pattern to produce a series of binary data bits having a sequence corresponding to the scanned sequence of scanned incremental areas; moving the member relative to the rays includes sweeping the rays across the imaged incremental areas of the member in the same predetermined pattern as in scanning the original image; and blocking and allowing the application of a ray includes blocking and allowing the application of a ray in synchronization with the series of binary data bits to form the binary elements in imaged incremental areas corresponding to the scanned incremental areas from which the binary data bits forming those binary elements were produced.

* * * * *

UNITED STATES PATENT AND TRADEMARK OFFICE
CERTIFICATE OF CORRECTION

PATENT NO. : 4,439,789

DATED : March 27, 1984

INVENTOR(S) : CAHILL

It is certified that error appears in the above-identified patent and that said Letters Patent are hereby corrected as shown below:

Column 4, line 42, change "the" (first occurrence) to --and--.

Column 10, line 3, after "72" insert --indicating the presence of one individual information forming structure--;

line 4, delete "indi-";

line 5, delete the entire line;

line 6, delete "ing structure".

Column 11, line 28, change "5" to --5%--.

Column 22, line 34, change "methods" to --method--.

Signed and Sealed this

Fourteenth Day of May 1985

[SEAL]

Attest:

DONALD J. QUIGG

Attesting Officer     Acting Commissioner of Patents and Trademarks